United States Patent
Borlick et al.

(10) Patent No.: US 11,347,426 B2
(45) Date of Patent: *May 31, 2022

(54) POINT IN TIME COPY OF TIME LOCKED DATA IN A STORAGE CONTROLLER

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Carol S. Mellgren, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 116 days.

This patent is subject to a terminal disclaimer.

(21) Appl. No.: 16/683,151

(22) Filed: Nov. 13, 2019

(65) Prior Publication Data

US 2020/0081624 A1    Mar. 12, 2020

Related U.S. Application Data

(63) Continuation of application No. 15/589,341, filed on May 8, 2017, now Pat. No. 10,489,080.

(51) Int. Cl.
*G06F 3/06* (2006.01)
*G06F 21/62* (2013.01)

(52) U.S. Cl.
CPC ............. *G06F 3/065* (2013.01); *G06F 3/067* (2013.01); *G06F 3/0623* (2013.01); *G06F 21/6209* (2013.01); *G06F 2221/2137* (2013.01)

(58) Field of Classification Search
CPC ........ G06F 3/065; G06F 3/067; G06F 3/0619; G06F 3/0623; G06F 21/6209; G06F 2221/2137

See application file for complete search history.

(56) References Cited

U.S. PATENT DOCUMENTS

| | | | |
|---|---|---|---|
| 6,389,420 B1 * | 5/2002 | Vahalia | ............... G06F 16/1774 |
| 6,711,687 B1 | 3/2004 | Sekiguchi | |
| 7,010,493 B2 | 3/2006 | Yamamoto et al. | |
| 7,313,557 B1 | 12/2007 | Noveck | |
| 7,340,640 B1 | 3/2008 | Karr et al. | |
| 7,702,909 B2 | 4/2010 | Vainstein | |
| 8,006,094 B2 | 8/2011 | Savitzky et al. | |
| 8,185,754 B2 | 5/2012 | Gill et al. | |
| 8,200,774 B1 | 6/2012 | Redstone et al. | |
| 8,423,505 B2 | 4/2013 | Chauvet et al. | |
| 8,732,417 B1 | 5/2014 | Stringham | |
| 8,954,408 B2 | 2/2015 | Dudgeon et al. | |

(Continued)

OTHER PUBLICATIONS

U.S. Appl. No. 16/688,722, filed Nov. 19, 2019.

(Continued)

*Primary Examiner* — Tasnima Matin
(74) *Attorney, Agent, or Firm* — Konrad Raynes Davda & Victor LLP; Rabindranath Dutta

(57) ABSTRACT

A computational device receives a command to activate a time lock for a data set. In response to receiving the command to activate the time lock for the data set, a point in time copy of the data set is generated to allow write operations to be performed even if the time lock is activated.

18 Claims, 11 Drawing Sheets

(56) References Cited

U.S. PATENT DOCUMENTS

| | | | |
|---|---|---|---|
| 9,075,762 | B2 | 7/2015 | Lahousse et al. |
| 9,218,295 | B2 | 12/2015 | Cohen |
| 9,665,493 | B2 | 5/2017 | Ash et al. |
| 9,697,268 | B1 | 7/2017 | Prater et al. |
| 9,853,949 | B1 | 12/2017 | Stickle et al. |
| 9,875,041 | B1 | 1/2018 | Redko et al. |
| 10,489,080 | B2 | 11/2019 | Borlick et al. |
| 10,514,721 | B2 | 12/2019 | Borlick et al. |
| 10,514,859 | B2 | 12/2019 | Borlick et al. |
| 10,528,435 | B2 | 1/2020 | Borlick et al. |
| 2001/0023421 | A1 | 9/2001 | Numao et al. |
| 2002/0026588 | A1 | 2/2002 | Sauvage |
| 2002/0138691 | A1 | 9/2002 | Yamamoto et al. |
| 2004/0153691 | A1 | 8/2004 | Fujimoto et al. |
| 2005/0050364 | A1 | 3/2005 | Feng |
| 2006/0004862 | A1 | 1/2006 | Fisher et al. |
| 2006/0085608 | A1 | 4/2006 | Saika |
| 2006/0095682 | A1 | 5/2006 | Fuente et al. |
| 2007/0124545 | A1 | 5/2007 | Blanchard et al. |
| 2010/0031315 | A1 | 2/2010 | Feng et al. |
| 2010/0037031 | A1 | 2/2010 | DeSantis et al. |
| 2010/0077165 | A1 | 3/2010 | Lu et al. |
| 2010/0169591 | A1 | 7/2010 | Atluri et al. |
| 2010/0223241 | A1 | 9/2010 | Hussain et al. |
| 2010/0250504 | A1 | 9/2010 | Balasubramanian et al. |
| 2011/0173154 | A1 | 7/2011 | Chauvet et al. |
| 2011/0185117 | A1* | 7/2011 | Beeston ............ G06F 3/0652 711/111 |
| 2011/0185136 | A1 | 7/2011 | Gavrilov et al. |
| 2011/0185253 | A1 | 7/2011 | Resch et al. |
| 2012/0102350 | A1 | 4/2012 | Belluomini et al. |
| 2013/0031069 | A1* | 1/2013 | Dudgeon ............ G06F 16/1774 707/704 |
| 2014/0019699 | A1 | 1/2014 | Cohen |
| 2014/0026002 | A1 | 1/2014 | Haines |
| 2014/0109182 | A1 | 4/2014 | Smith et al. |
| 2015/0100557 | A1 | 4/2015 | Golod et al. |
| 2015/0248333 | A1 | 9/2015 | Aravot |
| 2015/0363125 | A1 | 12/2015 | Vijayakumari Rajendran Nair et al. |
| 2016/0019300 | A1 | 1/2016 | Dove et al. |
| 2016/0036788 | A1 | 2/2016 | Conrad et al. |
| 2016/0098295 | A1 | 4/2016 | Ash et al. |
| 2018/0114387 | A1 | 4/2018 | Klink et al. |
| 2018/0321849 | A1 | 11/2018 | Borlick et al. |
| 2018/0321850 | A1 | 11/2018 | Borlick et al. |
| 2018/0321998 | A1 | 11/2018 | Borlick et al. |
| 2018/0322071 | A1 | 11/2018 | Borlick et al. |
| 2020/0081480 | A1 | 3/2020 | Borlick et al. |
| 2020/0110673 | A1 | 4/2020 | Borlick et al. |
| 2020/0089411 | A1 | 7/2020 | Park et al. |

OTHER PUBLICATIONS

Preliminary Amendment filed Nov. 15, 2019, pp. 7, for U.S. Appl. No. 16/688,722, filed Nov. 19, 2019.
Office Action dated Sep. 11, 2020, pp. 29, for U.S. Appl. No. 16/688,722.
U.S. Appl. No. 16/686,009, filed Nov. 15, 2019.
Preliminary Amendment filed Nov. 15, 2019, pp. 8, for U.S. Appl. No. 16/686,009.
U.S. Appl. No. 16/688,710, filed Nov. 19, 2019.
Preliminary Amendment filed Nov. 19, 2019, pp. 7, for U.S. Appl. No. 16/688,710.
List of IBM Patents or Patent Applications Treated as Related, dated Sep. 14, 2020, pp. 2.
"Enhanced Application Security via Time Constrained Functionality," IP.com No. IPCOM000234628D, Jan. 23, 2014, pp. 4.
R.C. Daley, et al., "A General-purpose File System for Secondary Storage," Proceedings of the Nov. 30-Dec. 1, 1965, Fall Joint Computer Conference, Part I, pp. 213-229, ACM, 1965.
U.S. Appl. No. 15/589,324, filed May 8, 2017.
Office Action dated Dec. 10, 2018, pp. 27, for U.S. Appl. No. 15/589,324.
Response dated Mar. 11, 2019, pp. 10, to Office Action dated Dec. 10, 2018, pp. 27, for U.S. Appl. No. 15/589,324.
Final Office Action dated Jun. 17, 2019, pp. 19, for U.S. Appl. No. 15/589,324.
Response dated Aug. 19, 2019, pp. 11, to Final Office Action dated Jun. 17, 2019, pp. 19, for U.S. Appl. No. 15/589,324.
Notice of Allowance dated Sep. 3, 2019, pp. 13, for U.S. Appl. No. 15/589,324.
U.S. Appl. No. 15/589,341, filed May 8, 2017.
Office Action dated Oct. 19, 2018, pp. 29, for U.S. Appl. No. 15/589,341.
Response dated Jan. 8, 2019, pp. 22, to Office Action dated Oct. 19, 2018, pp. 29, for U.S. Appl. No. 15/589,341.
Notice of Allowance dated Apr. 17, 2019, pp. 27, for U.S. Appl. No. 15/589,341.
Notice of Allowance dated Jul. 25, 2019, pp. 10, for U.S. Appl. No. 15/589,341.
U.S. Appl. No. 15/589,349, filed May 8, 2017.
Office Action dated Sep. 4, 2018, pp. 24, for U.S. Appl. No. 15/589,349.
Response dated Dec. 4, 2018, pp. 12, to Office Action dated Sep. 4, 2018, pp. 24, for U.S. Appl. No. 15/589,349.
Final Office Action dated Jan. 24, 2019, pp. 16, U.S. Appl. No. 15/589,349.
Response dated Apr. 24, 2019, pp. 11, to Final Office Action dated Jan. 24, 2019, pp. 16, U.S. Appl. No. 15/589,349.
Notice of Allowance dated Aug. 7, 2019, pp. 17, for U.S. Appl. No. 15/589,349.
U.S. Appl. No. 15/589,373, filed May 8, 2017.
Office Action dated Jul. 16, 2018, pp. 14, for U.S. Appl. No. 15/589,373.
Response dated Oct. 15, 2018, pp. 7 ,to Office Action dated Jul. 16, 2018, pp. 14, for U.S. Appl. No. 15/589,373.
Final Office Action dated Jan. 18, 2019, pp. 26, for U.S. Appl. No. 15/589,373.
Response dated Apr. 10, 2019, pp. 3, to Final Office Action dated Jan. 18, 2019, pp. 26, for U.S. Appl. No. 15/589,373.
Notice of Allowance dated Aug. 6, 2019, pp. 19, for U.S. Appl. No. 15/589,373.
List of IBM Patents and Applications Treated as Related, pp. 2, dated Nov. 13, 2019.
Response dated May 17, 2021, pp. 10, to Office Action dated Feb. 17, 2021, pp. 35, for U.S. Appl. No. 16/686,009.
Response dated May 11, 2021, pp. 10, to Office Action dated Feb. 11, 2021, pp. 32, for U.S. Appl. No. 16/688,710.
Response dated Dec. 11, 2020, pp. 9, to Office Action dated Sep. 11, 2020, pp. 29, for U.S. Appl. No. 16/688,722.
Notice of Allowance dated Jan. 13, 2021, pp. 5, for U.S. Appl. No. 16/688,722.
Office Action dated Feb. 17, 2021, pp. 35, for U.S. Appl. No. 16/686,009.
Office Action dated Feb. 11, 2021, pp. 32, for U.S. Appl. No. 16/688,710.
Response dated Oct. 13, 2021, pp. 12, to Final Office Action dated Jul. 13, 2021, pp. 29, for U.S. Appl. No. 16/686,009.
Response dated Oct. 13, 2021, pp. 9, to Final Office Action dated Jul. 13, 2021, pp. 29, for U.S. Appl. No. 16/688,710.
Final Office Action dated Jul. 13, 2021, pp. 29, for U.S. Appl. No. 16/686,009.
Final Office Action dated Jul. 13, 2021, pp. 34, for U.S. Appl. No. 16/688,710.
Office Action dated Jan. 25, 2022, pp. 29, for U.S. Appl. No. 16/686,009.
Office Action dated Feb. 18, 2022, pp. 37, for U.S. Appl. No. 16/688,710.

* cited by examiner

POINT IN TIME COPY OF TIME LOCKED DATA IN A STORAGE CONTROLLER

CROSS-REFERENCE TO RELATED APPLICATION

This application is a continuation of U.S. patent application Ser. No. 15/589,341, filed May 8, 2017, which application is incorporated herein by reference in its entirety.

BACKGROUND

1. Field

Embodiments relate to a point in time copy of time locked data in a storage controller.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

In many systems, data on one storage device may be copied to the same or another storage device so that access to data volumes may be provided from two different locations. Point in time copy allows creation of instantaneous, point in time snapshot copies of entire logical volumes or data sets. A point in time copy may involve physically copying all the data from a source volume to a target volume so that the target volume has a copy of the data as of a point in time. A point in time copy can also be generated by logically creating a copy of the data and then copying data over only when necessary. A point in time copy operations may also be referred to as flash operations. FlashCopy* (FLC) is a type of point in time copy in which nearly instantaneous point in time snapshot copies of entire logical volumes or data sets may be created.

*IBM, zSeries, pSeries, xSeries, BladeCenter, WebSphere, FlashCopy, and DB2 are trademarks of International Business Machines Corporation registered in many jurisdictions worldwide.

A time lock is a mechanism that locks data for a period of time. U.S. Pat. No. 9,218,295 describes a method for implementing time locks. U.S. Pat. No. 8,185,754 describes a method for time-based storage access. U.S. Pat. No. 7,313,557 describes a multi-protocol lock manager that manages granting, revoking and releasing of various types of locks on files. U.S. Pat. No. 7,010,493 describes a method for managing access to storage resources according to an access time. US patent publication 2015/0363125 describes a method for executing a copy-offload operation. U.S. Pat. No. 9,075,762 describes a method for setting copy permissions for target data in a copy relationship. U.S. Pat. No. 8,954,408 describes a method for allowing writes to complete without obtaining a write lock to a file. US patent publication 2006/0095682 describes a method for lock management for a flash copy image of a region of data in N-way shared storage system.

SUMMARY OF THE PREFERRED EMBODIMENTS

Provided are a method, system, and computer program product in which a computational device receives a command to activate a time lock for a data set. In response to receiving the command to activate the time lock for the data set, a point in time copy of the data set is generated to allow write operations to be performed even if the time lock is activated. As a result, the point in time copy allows a time locked data of a data set to be accessed.

In additional embodiments, the time lock is applied to the point in time copy, and the write operations are allowed to be performed on the data set. As a result, the original copy of the data set is stored in the point in time copy and time locked, and modifications are allowed to the data set.

In further embodiments, the time lock is applied to the data set, and the write operations are allowed to be performed on the point in time copy. As a result, the data set is locked and the point in time copy that is a copy of the data set is allowed to be modified.

In certain embodiments, an alarm is set at a time at which the time lock is to start. In response to an occurrence of the alarm, the point in time copy is generated. As a result, the generation of the point in time copy is performed in response to an alarm.

In further embodiments, in response to stopping a write operation for a first time as a result of the time lock, the point in time copy is generated. As a result, the generation of the point in time copy is delayed until a first write to a time locked data is attempted.

In additional embodiments, on expiry of the time lock the point in time copy is deleted, but the data set is maintained. As a result, either the time locked data or modified data is retained.

In yet additional embodiments, on expiry of the time lock the data set is deleted, but the point in time copy is maintained. As a result, either the time locked data or modified data is retained.

In further embodiments, on expiry of the time lock both the data set and the point in time copy are maintained. As a result, both the time locked data and the modified data are retained.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

There may be several reasons for a storage controller to protect data with a time lock. For example, there may be legal reasons to not allow access to data for a certain period of time. In situations where no one accesses certain data during certain periods of time, the time lock may provide a safety mechanism to prevent a breach of access to the data during those times. In certain embodiments, a time lock may be used for data that is no longer needed for the foreseeable future but still needs to be retained.

A problem with time locks is that while a time lock is active, no user or process may be able to access the time locked data. There may be situations in which a time lock is needed to prevent modifications to data, but there may be users or processes that need just a copy of data that they can modify, without having access to the original time locked data.

Certain embodiments provide a storage controller to store data received from a host. The storage controller provides time lock mechanisms for data. The storage controller also provides a point in time copy facility for the data, where the data is subject to the time lock. In certain embodiments, the point in time copy is for new data that is attempted to be written to the time locked data.

In certain embodiments a point in time copy is generated from the data that is to be time locked, and the point in time copy is allowed to be modified after the time lock is active.

In certain other embodiments, a point in time copy is generated from the data that is to be time locked. The point in time copy is time locked, and the original data is allowed to be modified.

Exemplary Embodiments

Figure 1:
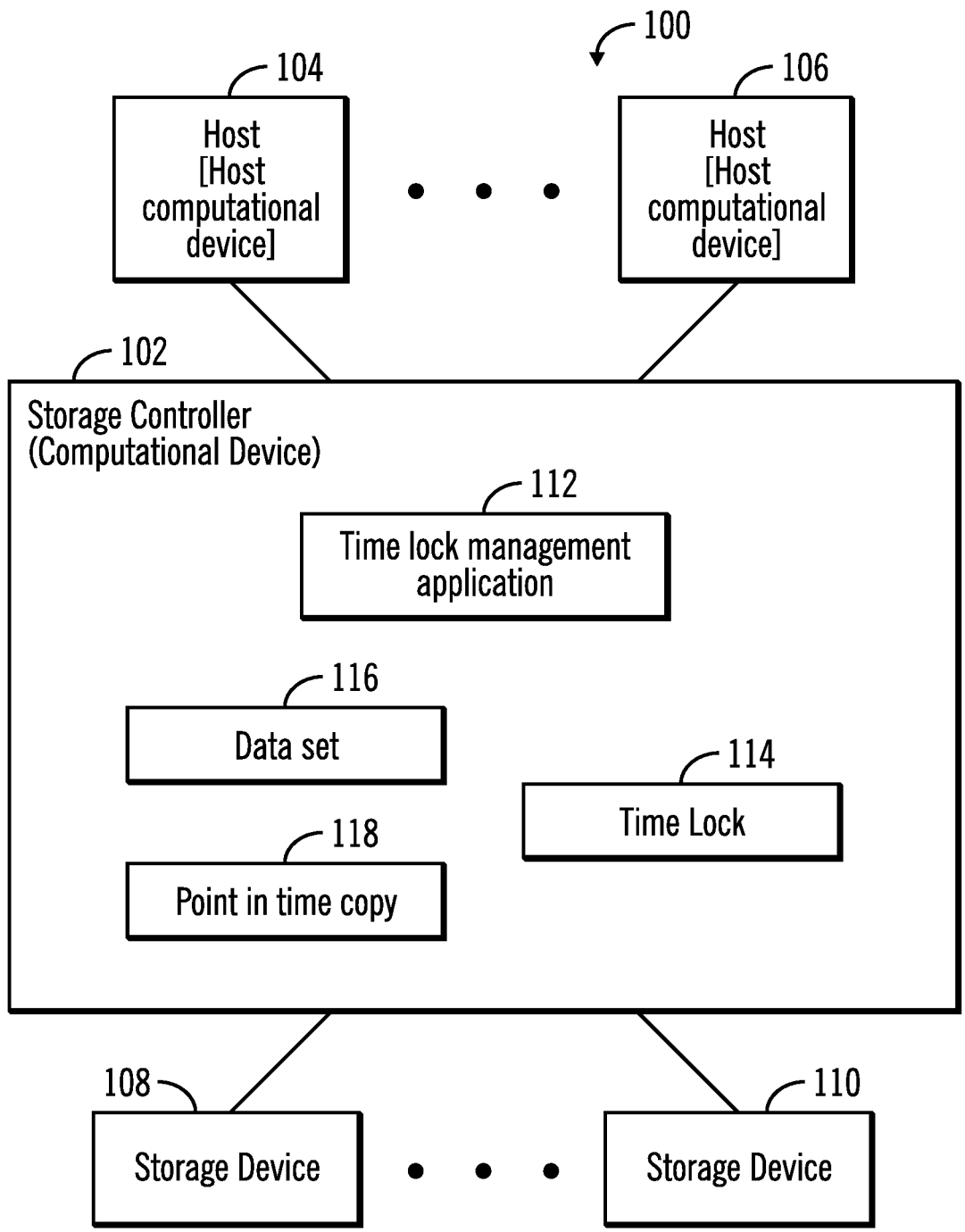
FIG. 1 illustrates a block diagram of a computing environment comprising a storage controller coupled to one or more hosts, and one or more storage devices, for management of time locks, in accordance with certain embodiments.

FIG. 1 illustrates a block diagram of a computing environment 100 comprising a storage controller 102 coupled to one or more hosts 104, 106, and one or more storage devices 108, 110, in accordance with certain embodiments. The storage controller 102 allows the plurality of hosts 104, 108 to perform input/output (I/O) operations with logical storage maintained by the storage controller 102. The physical storage corresponding to the logical storage may be found in one or more of the storage devices 108, 110 of the storage controller 102.

The storage controller 102 and the hosts 104, 106 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102, the hosts 104, 106, and the storage devices 108, 110 may be elements in any suitable network, such as, a storage area network, a wide area network, the Internet, an intranet. In certain embodiments, the storage controller 102, the hosts 104, 106, and the storage devices 108, 110 may be elements in a cloud computing environment that comprises the computing environment 100. The storage devices 108, 110 may be comprised of storage disks, tape drives, solid state storage, etc., and may be controlled by the storage controller 102.

In certain embodiments, a time lock management application 112 that executes in the storage controller 102 may generate one or more time locks 114 to protect a data set 116 for a predetermined duration of time. The time lock management application 112 may be implemented in software, hardware, firmware or any combination thereof.

In certain embodiments, the time lock management application 112 generates a point in time copy 118 of the data set 116. The time lock 114 may be applied to either the data set 116 or the point in time copy 118. If the time lock 114 is applied to the data set 116, then the point in time copy 118 is allowed to be modified. However if the time lock 114 is applied to the point in time copy 118, then the data set 116 is allowed to be modified.

Figure 2:
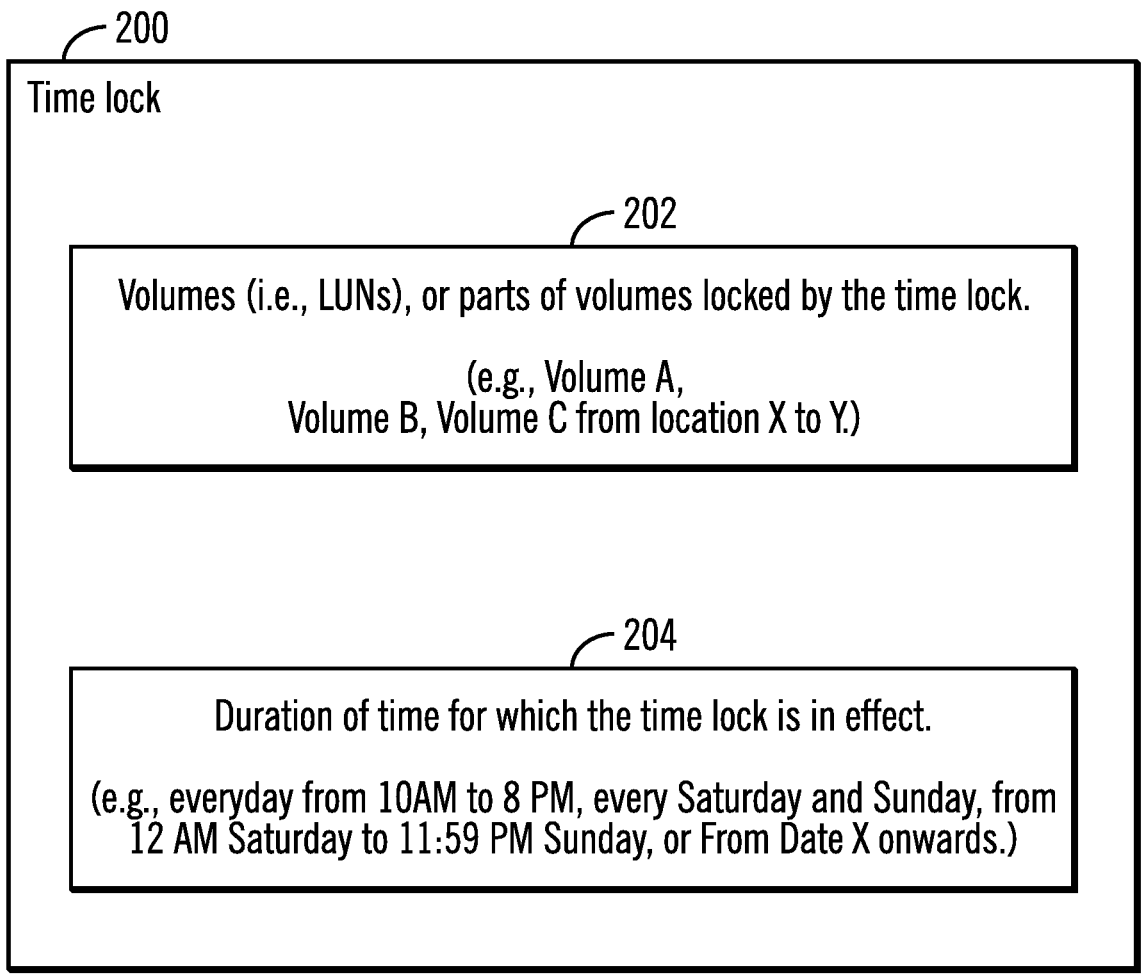
FIG. 2 illustrates a block diagram that shows elements described by an exemplary time lock, in accordance with certain embodiments.

FIG. 2 illustrates elements described by an exemplary time lock 200 that in certain embodiments may comprise the time lock 114 shown in FIG. 1. The time lock 200 may indicate volumes [(i.e., logical units (LUNs)] and/or parts of volumes locked by the time lock 200 (as shown via reference numeral 202). For example, in certain embodiments the time lock 200 may indicate that volume A, volume B, and volume C from location X to location Y are locked by the time lock 200. The data set 116 with which the time lock 114 is associated may be stored in the volumes and/or parts of volumes.

The time lock 200 may also indicate the duration for which the time lock 200 is in effect (as shown via reference numeral 204). For example, in certain embodiments, the time lock 200 may be in effect every day from 10 AM to 8 PM. In other embodiments, the time lock 200 may be in effect for the whole day every Saturday and Sunday. In still further embodiments, the time lock 200 may be in effect from 12 AM Saturday to 11:59 PM Sunday. In yet another embodiment, the time lock may be in effect from Date X onwards (e.g., from Dec. 12, 2017 onwards).

Figure 3:
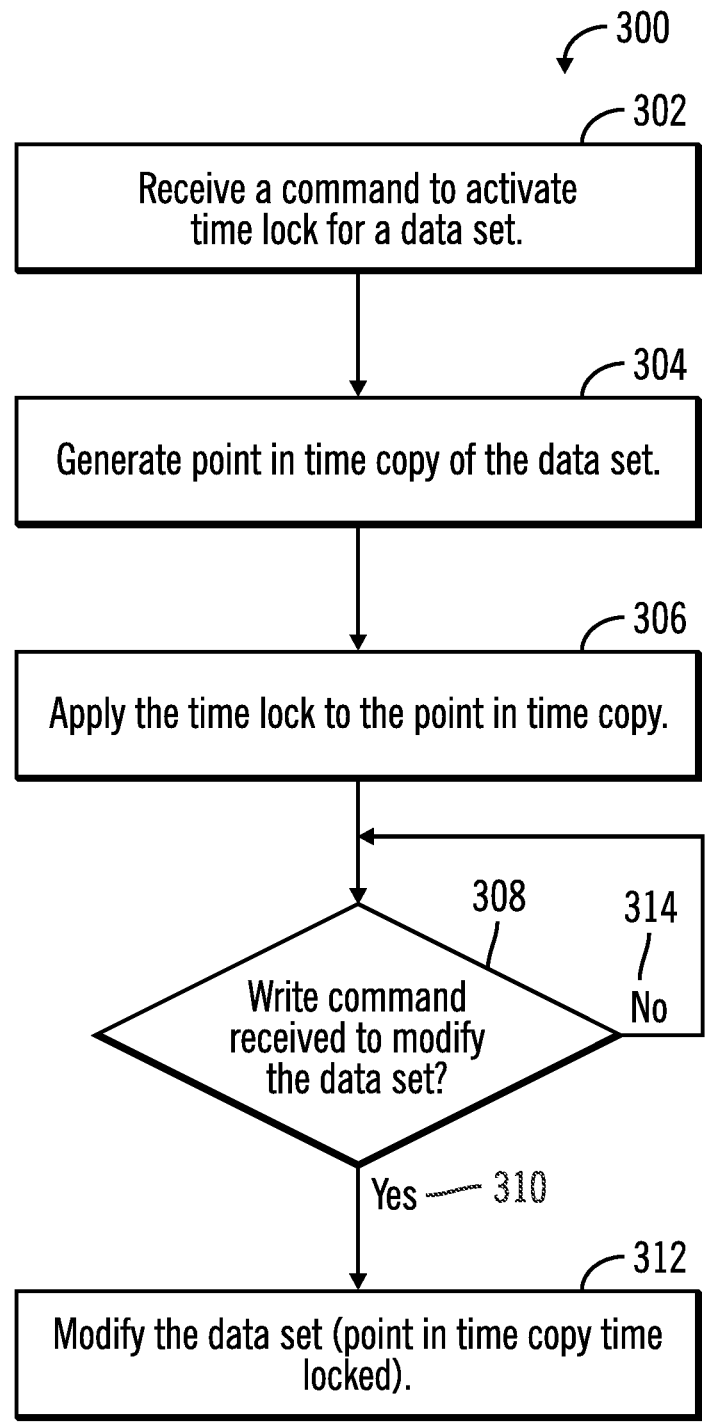
FIG. 3 illustrates a flowchart that shows generating a point in time copy of a data set and then subjecting the point in time copy to a time lock and allowing modifications to the data set, in accordance with certain embodiments.

FIG. 3 illustrates a flowchart 300 that shows generating a point in time copy 1 of a data set and then subjecting the point in time copy to a time lock and allowing modifications to the data set, in accordance with certain embodiments. The operations shown in FIG. 3 may be performed by the time lock management application 112 that executes in the storage controller 102.

Control starts at block 302 in which the time lock management application 112 receives a command to activate a time lock for a data set 116. The time lock management application 112 generates (at block 304) a point in time copy 118 of the data set 116. Control proceeds to block 306 in which the time lock management application 112 applies the time lock 114 to the point in time copy 118. Application of the time lock 114 to the point in time copy 118 prevents the point in time copy 118 from being modified.

From block 306 control proceeds to block 308 in which the time lock management application 112 determines whether a write command has been received to modify the data set 116. If so ("Yes" branch 310), then the data set 116 is modified (at block 312) by applying the write command on the data set 116. However, the point in time copy 118 stores the unmodified copy of the data set 116 and is time locked.

If no write command has been received (at block 308) ["No' branch 314], then the determination of whether a write command has been received to modify the data set is repeated.

Therefore, FIG. 3 illustrates certain embodiments in which the point in time copy 118 of a data set 116 is time locked, and the data set 116 is allowed to be modified.

Figure 4:
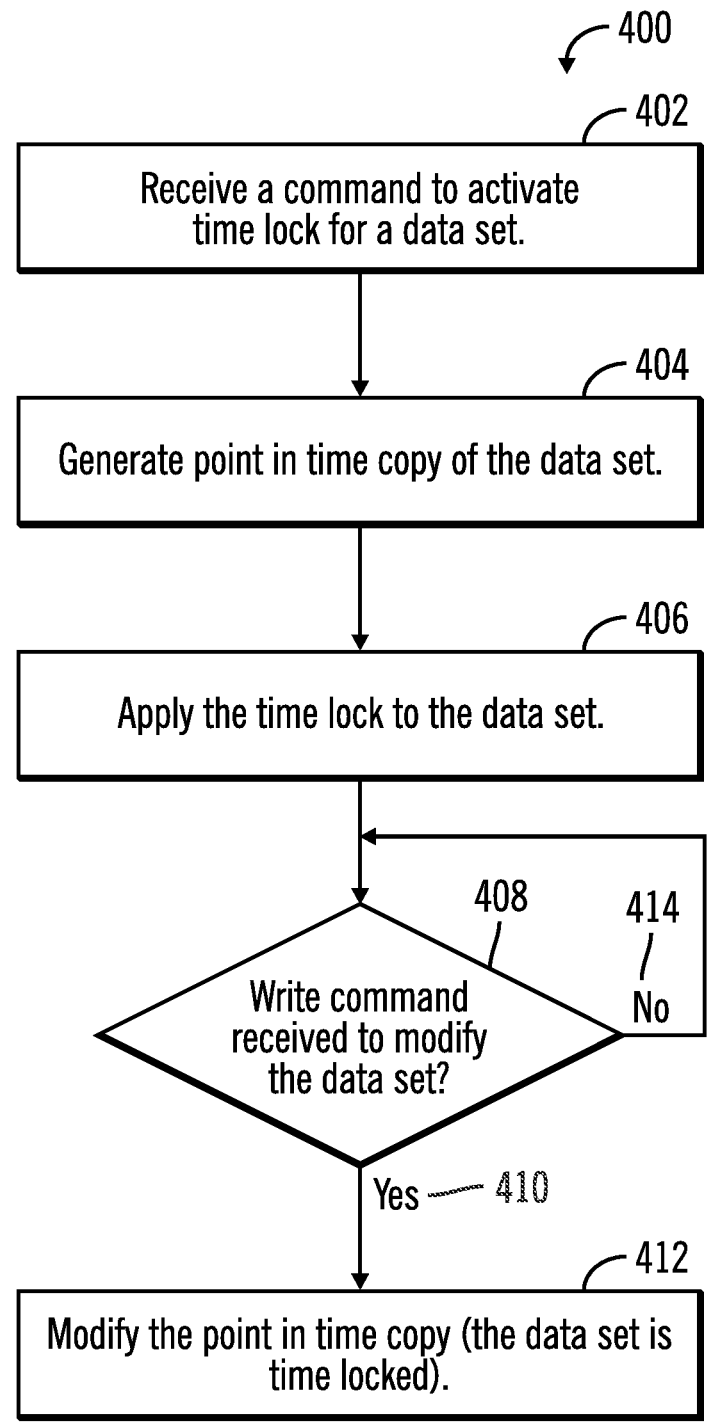
FIG. 4 illustrates a flowchart that shows generating a point in time copy of a data set and then subjecting the data set to a time lock and allowing modifications to the point in time copy, in accordance with certain embodiments.

FIG. 4 illustrates a flowchart 400 that shows generating a point in time copy of a data set and then subjecting the data set to a time lock and allowing modifications to the point in time copy, in accordance with certain embodiments. The operations shown in FIG. 4 may be performed by the time lock management application 112 that executes in the storage controller 102.

Control starts at block 402 in which the time lock management application 112 receives a command to activate a time lock for a data set 116. The time lock management application 112 generates (at block 404) a point in time copy 118 of the data set 116. Control proceeds to block 406 in which the time lock management application 112 applies the time lock 114 to the data set 116. Application of the time lock 114 to the data set 116 prevents the data set 116 from being modified.

From block 406 control proceeds to block 408 in which the time lock management application 112 determines whether a write command has been received to modify the data set 116. If so ("Yes" branch 410), then the point in time copy 118 is modified (at block 412) by applying the write command on the point in time copy 118. However, the data set 116 remains unmodified, as the data set 116 is time locked.

If no write command has been received (at block 408) ("No' branch 414), then the determination of whether a write command has been received to modify the data set is repeated.

Therefore, FIG. 4 illustrates certain embodiments in which the data set 116 is time locked, and the point in time copy 118 of the data set 116 is allowed to be modified.

Figure 5:
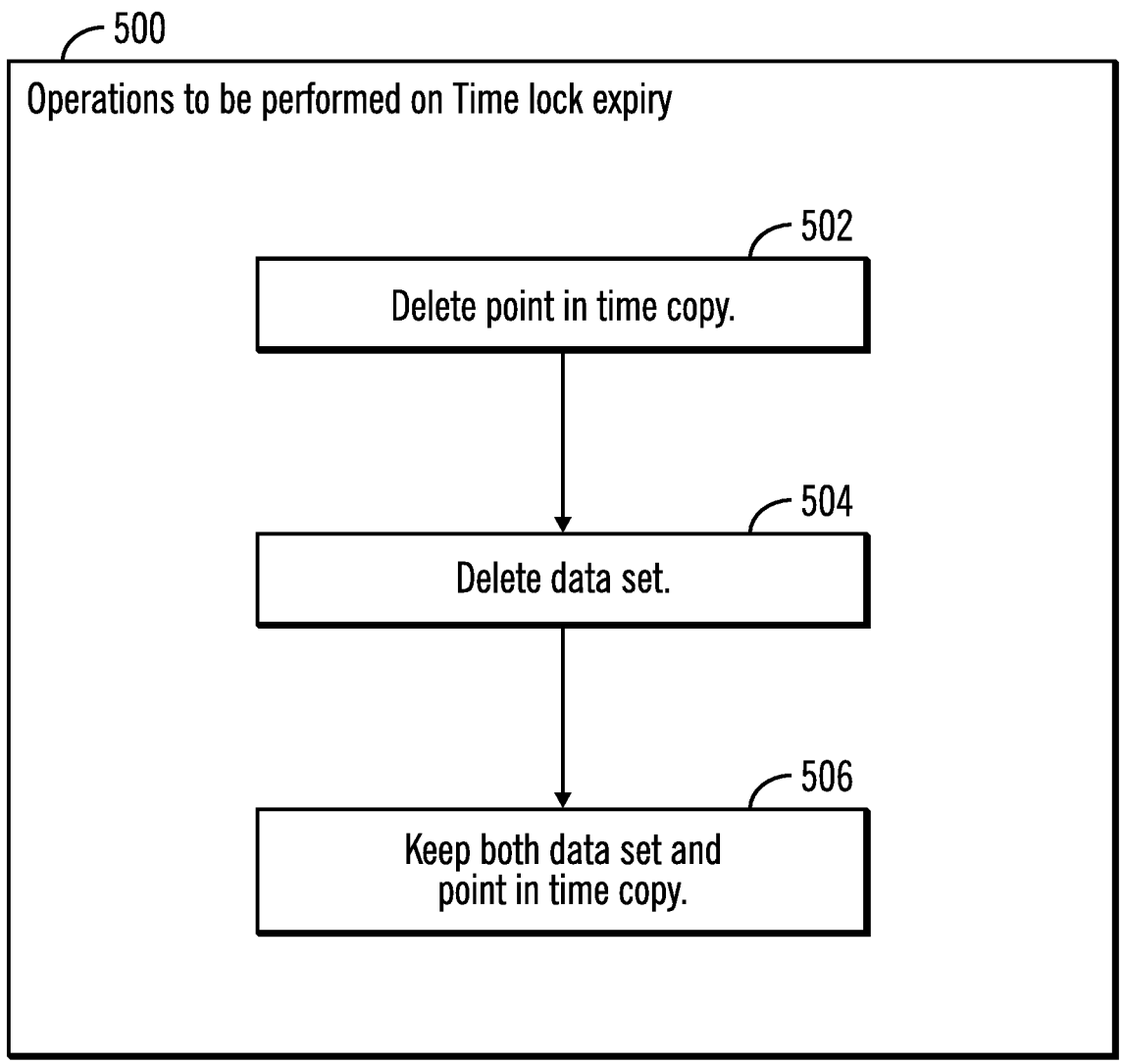
FIG. 5 illustrates a block diagram that shows operations to be performed on time lock expiry, in accordance with certain embodiments.

FIG. 5 illustrates a block diagram 500 that shows operations to be performed on time lock expiry, in accordance with certain embodiments. The operations shown in FIG. 5 may be performed by the time lock management application 112 that executes in the storage controller 102.

An activated time lock may expire after a certain period of time or at a certain time. For example, a time lock may expire at 2 PM on Apr. 14, 2017. In certain embodiments, on expiry of the time lock, the point in time copy is deleted, but the data set is maintained (shown via reference numeral 502). In alternative embodiments, on expiry of the time lock, the data set is deleted, but the point in time copy is maintained (shown via reference numeral 504). In other embodiments, on expiry of the time lock, both the data set and the point in time copy are maintained (as shown via reference numeral 506.

Figure 6:
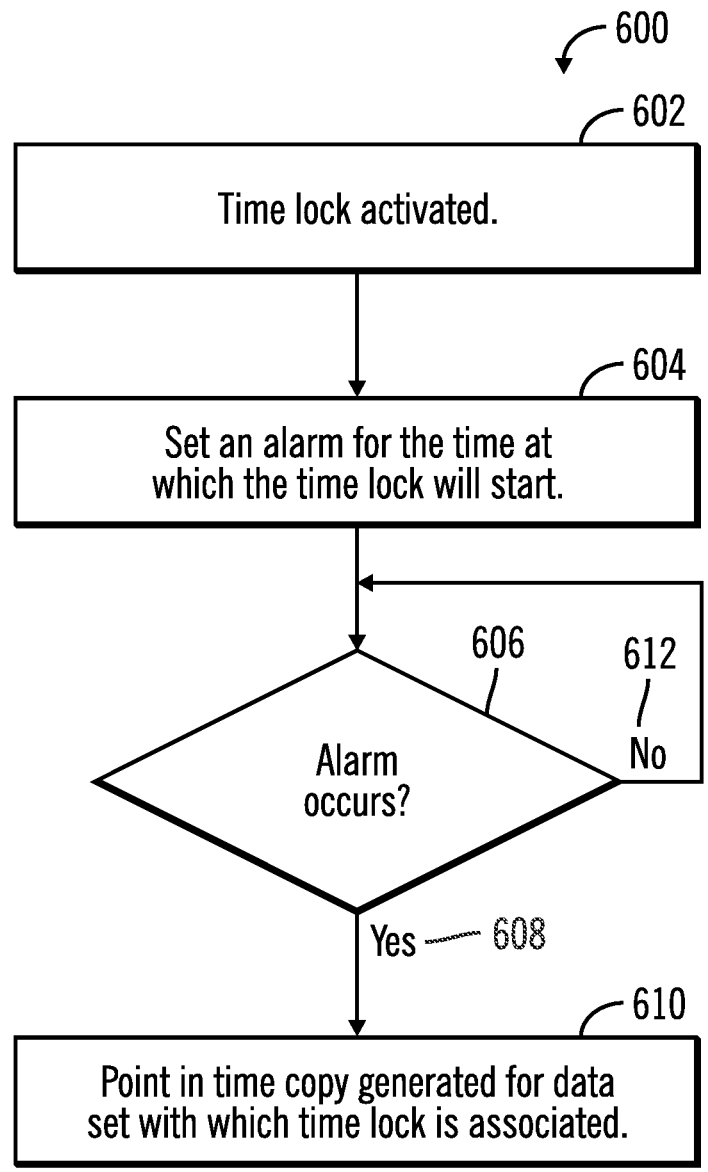
FIG. 6 illustrates a flowchart that shows a point in time copy being generated, in response to a previously set alarm, in accordance with certain embodiments.

FIG. 6 illustrates a flowchart 600 that shows a point in time copy being generated, in response to a previously set alarm, in accordance with certain embodiments. The operations shown in FIG. 6 may be performed by the time lock management application 112 that executes in the storage controller 102.

Control starts at block 602 in which a time lock 114 is activated. The time lock management application 112 sets an alarm for the time at which the time lock will start (at block 604). A determination is made at block 606 as to whether the alarm occurs. If so ("Yes" branch 608), then control proceeds to block 610 in which the point in time copy 118 is generated for the data set 116 with which the time lock 114 is associated. If not ("No' branch 612), control return again to block 606.

Figure 7:
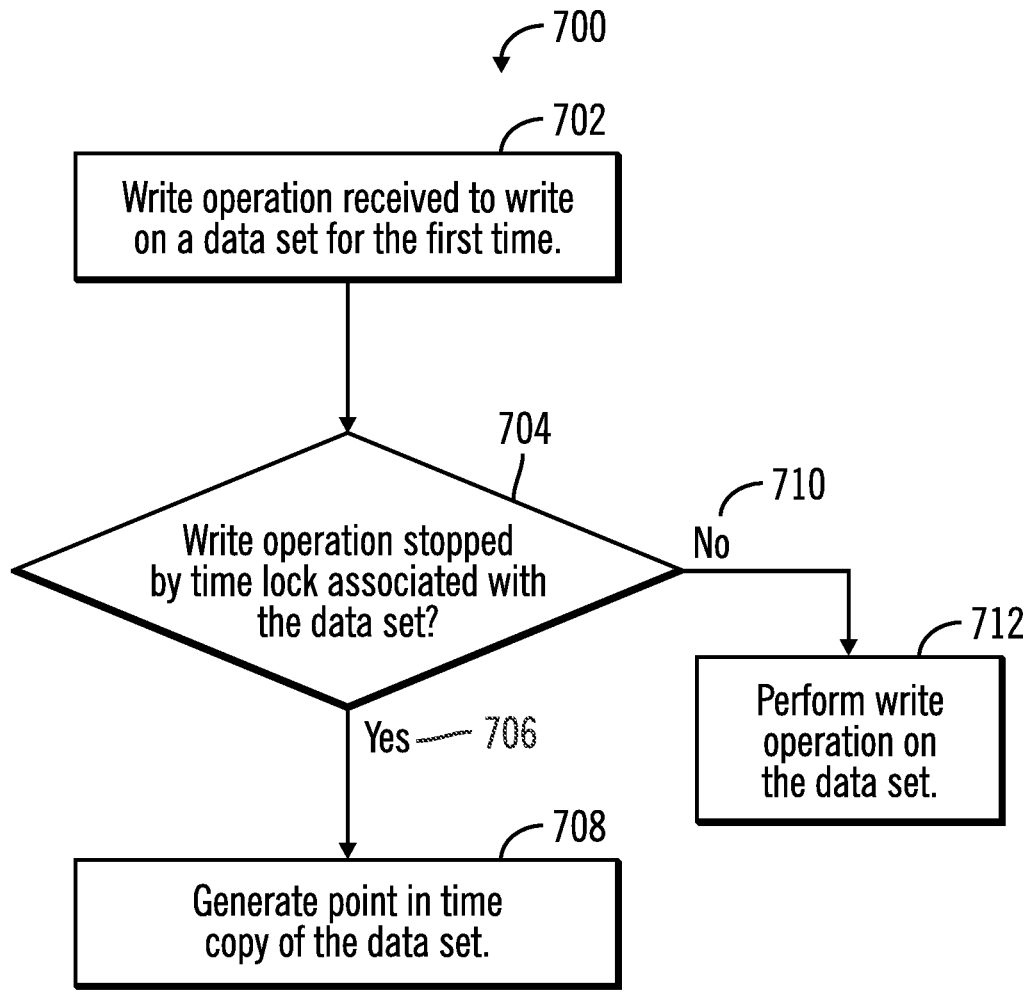
FIG. 7 illustrates a flowchart that shows a point in time copy being generated, in response to a first write being received on a data set that is associated with a time lock, in accordance with certain embodiments.

FIG. 7 illustrates a flowchart 700 that shows a point in time copy being generated, in response to a first write being received on a data set that is associated with a time lock, in accordance with certain embodiments. The operations shown in FIG. 7 may be performed by the time lock management application 112 that executes in the storage controller 102.

Control starts at block 702 in which a write operation is received to write on a data set 116 for the first time. A determination is made (at block 704) as to whether the write operation is stopped (i.e., not allowed to write data) by the time lock 114 associated with the data set 116.

If the write operation is stopped ("Yes" branch 706), then the time lock management application 112 generates (at block 708) the point in time copy 118 of the data set 116. However, if the write operation is not stopped ("No" branch 710), then the write operation is performed on the data set 116 (at block 712).

Figure 8:
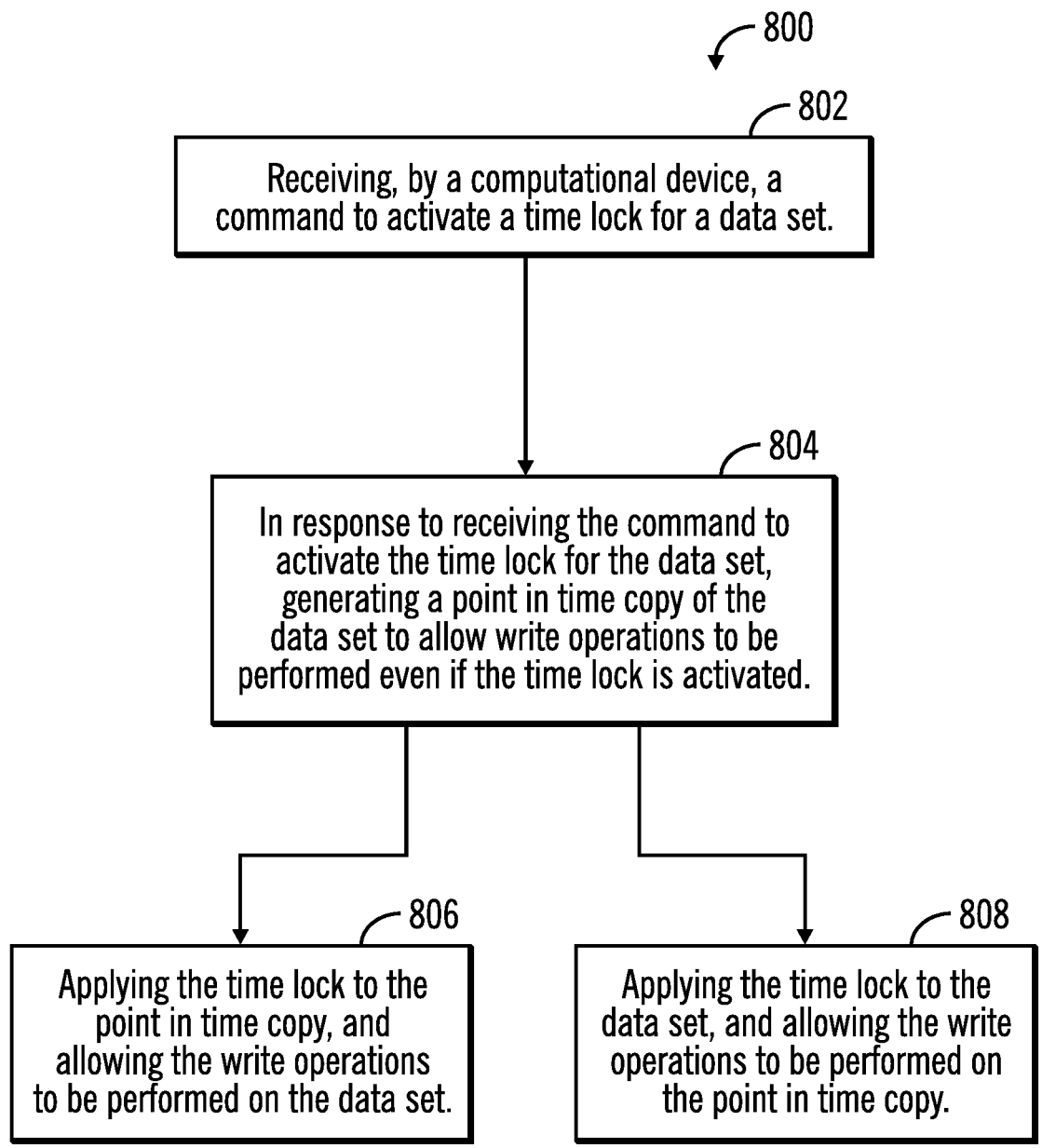
FIG. 8 illustrates a flowchart that shows generation of a point in time copy of a data set to be subjected to a time lock, in accordance with certain embodiments.

FIG. 8 illustrates a flowchart 800 that shows generation of a point in time copy of a data set to be subjected to a time lock, in accordance with certain embodiments. The operations shown in FIG. 8 may be performed by the time lock management application 112 that executes in the storage controller 102.

Control starts at block 802 in which a computational device 102 (e.g. storage controller 102) receives a command to activate a time lock 114 for a data set 116. In response to receiving the command to activate the time lock 114 for the data set 116, a point in time copy 118 of the data set 116 is generated to allow write operations to be performed even if the time lock 114 is activated (at block 804).

From block 804 control may proceed to either block 806 or block 808. In block 806, the time lock is applied to the point in time copy 118, and the write operations are allowed to be performed on the data set 116. In block 808, the time lock is applied to the data set 116, and the write operations are allowed to be performed on the point in time copy 118.

Therefore FIGS. 1-8 illustrate certain embodiments in which a point in time copy allows the contents of a data set to be accessed even when a time lock is associated with the data set.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
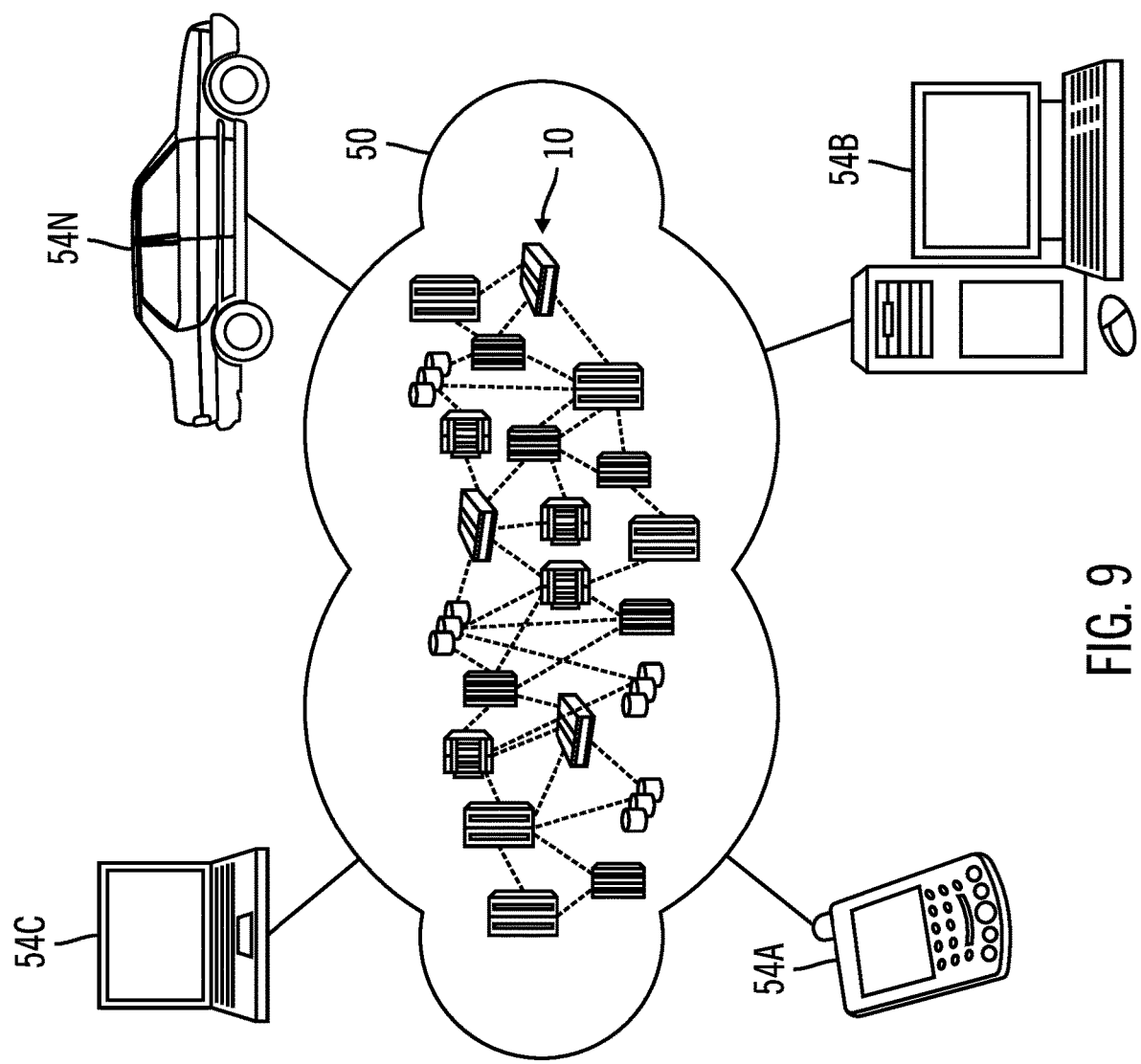
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
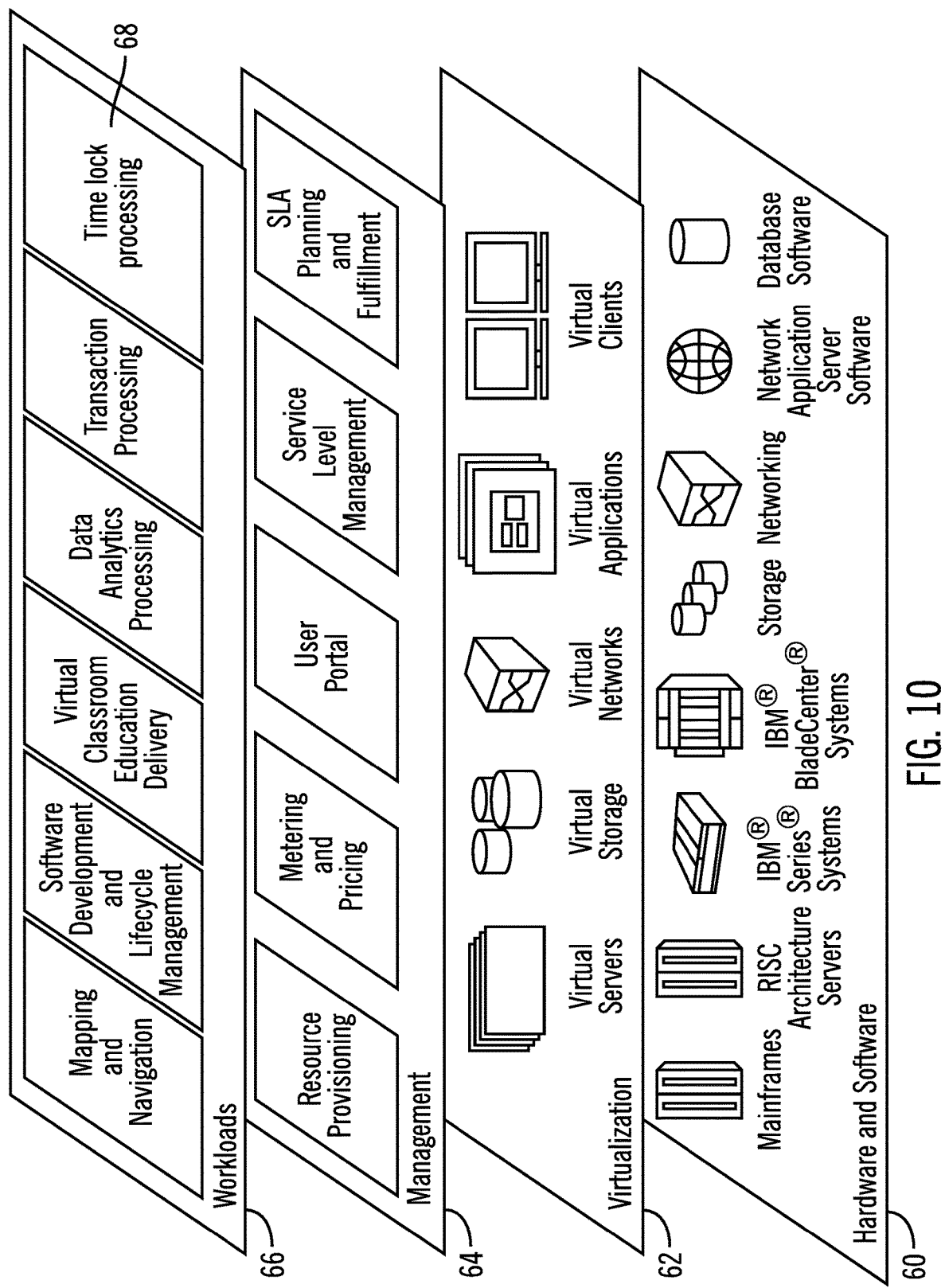
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and time lock processing 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
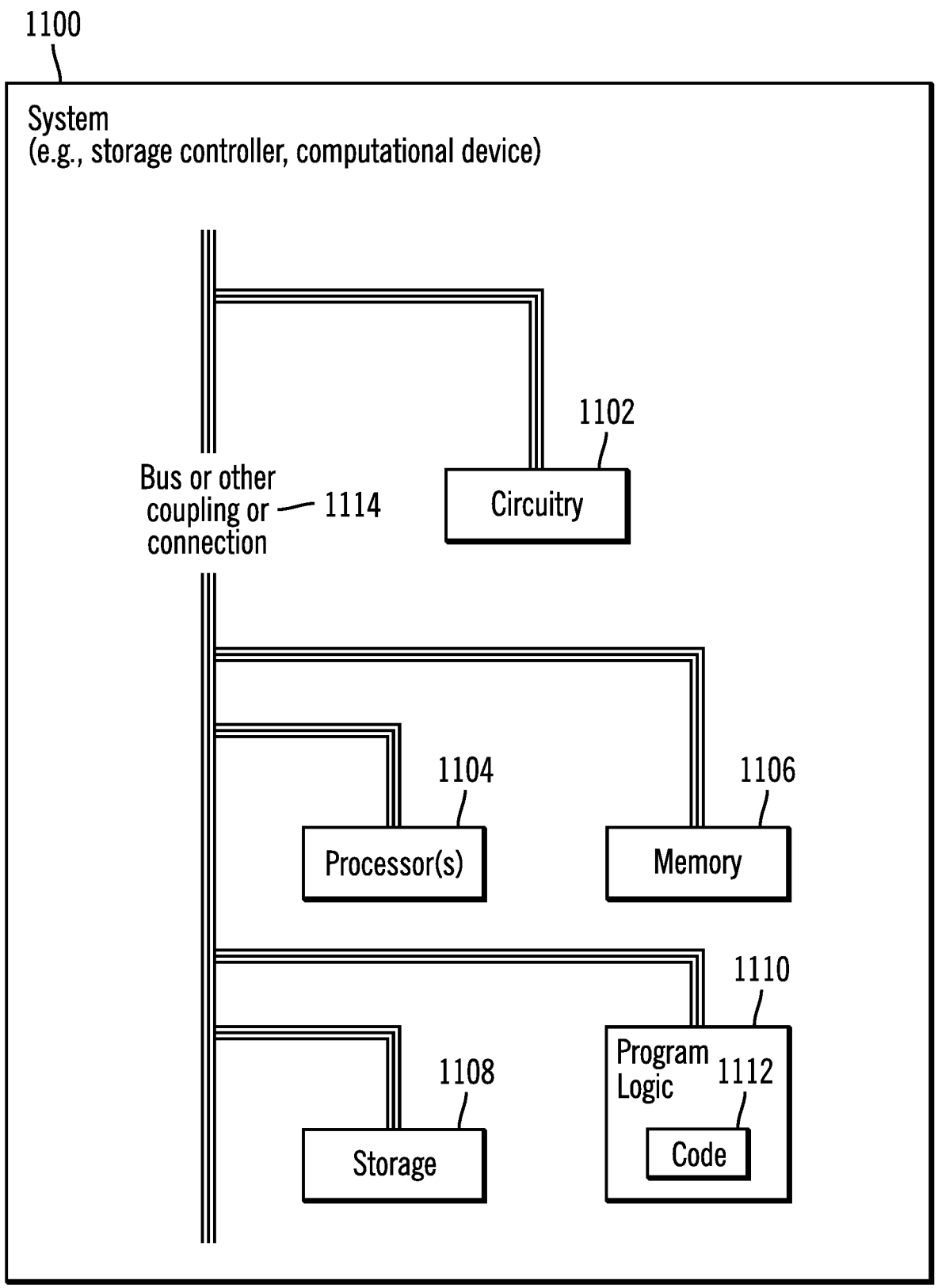
FIG. 11 illustrates a block diagram of a computational system that shows certain elements that may be included in the storage controller or the host, as described in FIGS. 1-10, in accordance with certain embodiments.

FIG. 11 illustrates a block diagram that shows certain elements that may be included in the storage controller 102, the hosts 104, 106, or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   setting an alarm at a time at which a time lock is to start for a data set;
   in response to an occurrence of the alarm subsequent to the setting of the alarm, generating a point in time copy of the data set to allow write operations to be performed on the point in time copy of the data set but not on the data set, wherein the time lock for the data set starts on the occurrence of the alarm, and wherein no write operations can be performed on the data set while the data set is time locked; and
   in response to the alarm not occurring subsequent to the setting of the alarm, determining once again whether the alarm occurs, and until the alarm occurs allowing write operations to be performed on the data set.

2. The method of claim 1, the method further comprising: in response to stopping a write operation for a first time as a result of the time lock, generating the point in time copy.

3. The method of claim 1, wherein on expiry of the time lock the point in time copy is deleted, but the data set is maintained.

4. The method of claim 1, wherein on expiry of the time lock the data set is deleted, but the point in time copy is maintained.

5. The method of claim 1, wherein on expiry of the time lock both the data set and the point in time copy are maintained.

6. A system, comprising:
   a memory; and
   a processor coupled to the memory, wherein the processor performs operations, the operations comprising:
   setting an alarm at a time at which a time lock is to start for a data set;
   in response to an occurrence of the alarm subsequent to the setting of the alarm, generating a point in time copy of the data set to allow write operations to be performed on the point in time copy of the data set but not on the data set, wherein the time lock for the data set starts on the occurrence of the alarm, and wherein no write operations can be performed on the data set while the data set is time locked; and
   in response to the alarm not occurring subsequent to the setting of the alarm, determining once again whether the alarm occurs, and until the alarm occurs allowing write operations to be performed on the data set.

7. The system of claim 6, the operations further comprising:
   in response to stopping a write operation for a first time as a result of the time lock, generating the point in time copy.

8. The system of claim 6, wherein on expiry of the time lock the point in time copy is deleted, but the data set is maintained.

9. The system of claim 6, wherein on expiry of the time lock the data set is deleted, but the point in time copy is maintained.

10. The system of claim 6, wherein on expiry of the time lock both the data set and the point in time copy are maintained.

11. A computer program product, the computer program product comprising a computer readable storage medium having computer readable program code embodied therewith, the computer readable program code configured to perform operations on a processor of a computational device, the operations comprising:
    setting an alarm at a time at which a time lock is to start for a data set;
    in response to an occurrence of the alarm subsequent to the setting of the alarm, generating a point in time copy of the data set to allow write operations to be performed on the point in time copy of the data set but not on the data set, wherein the time lock for the data set starts on the occurrence of the alarm, and wherein no write operations can be performed on the data set while the data set is time locked; and
    in response to the alarm not occurring subsequent to the setting of the alarm, determining once again whether the alarm occurs, and until the alarm occurs allowing write operations to be performed on the data set.

12. The computer program product of claim 11, the operations further comprising:
    in response to stopping a write operation for a first time as a result of the time lock, generating the point in time copy.

13. The computer program product of claim 11, wherein on expiry of the time lock the point in time copy is deleted, but the data set is maintained.

14. The computer program product of claim 11, wherein on expiry of the time lock the data set is deleted, but the point in time copy is maintained.

15. The computer program product of claim 11, wherein on expiry of the time lock both the data set and the point in time copy are maintained.

16. The method of claim 1, wherein the time lock indicates parts of volumes locked by the time lock, and wherein the data set with which the time lock is associated is stored in the parts of volumes locked by the time lock.

17. The system of claim 6, wherein the time lock indicates parts of volumes locked by the time lock, and wherein the data set with which the time lock is associated is stored in the parts of volumes locked by the time lock.

18. The computer program product of claim 11, wherein the time lock indicates parts of volumes locked by the time lock, and wherein the data set with which the time lock is associated is stored in the parts of volumes locked by the time lock.

* * * * *